United States Patent [19]

Schlicht et al.

[11] Patent Number: 4,479,811

[45] Date of Patent: Oct. 30, 1984

[54] METHOD FOR THE DRYING AND REMOVAL OF HYDROCARBONS FROM GASES

[75] Inventors: Burkhard Schlicht; Christel Sonntag; Hans Beise; Otto Lindner, all of Berlin; Klaus Wehner, Leuna; Werner Burk, Halle-Neustadt; Manfred Gross; Hans-Peter Minak, both of Freiberg, all of German Democratic Rep.

[73] Assignee: VEB Chemieanlagenbaukombinat Leipzig-Grimma, Grimma, German Democratic Rep.

[21] Appl. No.: 469,832

[22] Filed: Feb. 28, 1983

[30] Foreign Application Priority Data

Jan. 19, 1982 [DD] German Democratic Rep. ................... 2368474

[51] Int. Cl.$^3$ ............................................. B01D 53/28
[52] U.S. Cl. ........................................... 55/32; 55/48
[58] Field of Search ..................................... 55/29–32, 55/48–51

[56] References Cited

U.S. PATENT DOCUMENTS

| | | | |
|---|---|---|---|
| 3,656,275 | 4/1972 | Hunter | 55/31 |
| 3,745,746 | 7/1973 | Psyras et al. | 55/31 |
| 3,745,747 | 7/1973 | Psyras et al. | 55/31 |
| 3,857,686 | 12/1974 | Arnold et al. | 55/32 X |
| 4,005,997 | 2/1977 | Fowler et al. | 55/32 |
| 4,009,083 | 2/1977 | Lyon et al. | 55/32 X |
| 4,052,176 | 10/1977 | Child et al. | 55/32 |
| 4,145,192 | 3/1979 | Beise et al. | 55/32 |

FOREIGN PATENT DOCUMENTS 629955 10/1978 U.S.S.R. ................................... 55/32

OTHER PUBLICATIONS

H. Franik, Erdgasaufbereitung, p. 122ff, VEB Deutscher Verlag fuer Grundstoffindustrie, Leipzig, 1964.
Kohl, Riesenfeld; Gas Purification, p. 571ff, Gulf Publishing Co., Houston, Texas, 1974.
Grosskinsky, Handbuch der Kokereiwesens, Band II, p. 137ff, Kart-Knopp-Verlag, Duesseldorf, 1958.
Ullrich, Koksofengasaufbereitung–Naphthalinabtrennung; Erdoel und Kohle, (1977), 6, 263 to 267.
Schmidt, Verfahren der Gasaufbereitung, pp. 173–192, VEB Deutscher Verlag fuer Grundstoffindustrie, Leipzig, 1970.

*Primary Examiner*—Robert Spitzer
*Attorney, Agent, or Firm*—Jordan and Hamburg

[57] ABSTRACT

The invention relates to a method for the drying and removal of hydrocarbons from gases.

It is the object of the invention to increase the absorption ability of the solvent for aromatic hydrocarbons including naphthalene and water, to save material and energy, to lower the investment- and operating costs, as well as to avoid operational disturbances and to increase the safety during gas treatment, gas transmittance and gas distribution. This object is accomplished by the invention in that a mixture of glycol, N-methyl-ε-caprolactam and water is used as solvent. The mixture comprises 79.9 to 97 percent by weight of glycol, 2 to 20 percent by weight of N-methyl-ε-caprolactam and 0.1 to 1 percent by weight of water. The regeneration temperature of the charged solvent mixture is 150° to 190° C., preferably 170° C. 3 to 15 percent by weight, preferably 10 percent by weight, of crude benzene is added to the charged solvent mixture.

The invention is especially useful for the purification and drying of coal degasification and cracking gases in customary absorption and desorption apparatuses.

18 Claims, No Drawings

METHOD FOR THE DRYING AND REMOVAL OF HYDROCARBONS FROM GASES

BACKGROUND OF THE INVENTION AND PRIOR ART STATEMENT

The invention relates to a method for the drying and removal of hydrocarbons from gases, especially aromatic hydrocarbons including naphthalene and water, from commercial and natural gases containing hydrocarbons, preferably coal degasifying- and cracking gases, by means of solvents in customary absorption- and desorption apparatuses.

Methods are already known which lower the water vapor dew point of gases, with the goal of having no condensation occurring in subsequent gas treatment, gas transmittance and gas distribution apparatuses, under the given circumstances. The absorption is preferably accomplished by glycol solutions for drying gases for public gas supply or for transport of natural gas over longer distances, with the necessary dew points reaching down to 20° C. (H. Franik, Erdgasaufbereitung, p. 122 ff, VEB Deutscher Verlag fuer Grundstoffindustrie, Leipzig 1964).

If the need exists for still lower dew points, such as, for example, of down to −70° C. in natural gas fractionating plants, it is known that absorbents such as silica gel or molecular sieve can be used (Kohl, Riesenfeld; Gaspurification, p. 571 ff, Gulf Publishing Company, Houston, Tex. 1974).

According to Grosskinsky (Handbuch der Kokereiwesens, Band II, p. 137 ff, Karl-Knapp-Verlag Duesseldorf (1958), benzene hydrocarbons and naphthalenes, contained in gases from coal degasification and oil gasification, can be removed in absorption apparatuses using high-boiling washing oil fractions.

It is further known that benzene hydrocarbons and naphthalenes can be absorbed on active coal, with these components being removed up to a point so that no condensation or sublimation occurs in the subsequent gas treatment, gas transmittance, and gas distribution apparatuses, under the respective pressure- and temperature conditions (Schmidt, Verfahren der Gassaufbereitung, p. 174 ff, VEB Deutscher Verlag fuer Grundstoffindustrie, Leipzig 1970).

Methods are further known, in which the dew point for water vapor, benzene hydrocarbons and naphthalenes is lowered by indirect cooling of the gas flow (Ullrich, Koksofengasaufarbeitung-Naphthalinabtrennung; Erdoel und Kohle (1977) 6, 263 to 267).

These known methods suffer from distinct disadvantages in those instances when the removal of benzene hydrocarbons, naphthalenes and water is to occur in one step and with the lowest possible expenditure of equipment, adjuvants and energy.

The glycol solutions which are used for gas drying, for example di- or triethylene glycol, exhibit a low absorption ability of benzene hydrocarbons and naphthalenes (DE-OS No. 2 449 864). The majority of these components therefore remain in the gas and thus the requisite values for the benzene hydrocarbons and naphthalenes cannot be reached. The operation of a glycol absorption apparatus therefore exhibits a considerable number of operational disturbances, due to the fact that the benzene hydrocarbons accumulate in liquid form, and the naphthalenes in crystal form, during minimal cooling of the gases. In order to be able to effectuate the gas drying with glycol, an active coal arrangement has to be added, resulting in the removal of these components.

The low gas velocity in the absorbers necessitates large apparatuses and considerable amounts of active coal. The desorption additionally requires considerable amounts of vapor, resulting in a very high energy consumption. The result is high investment- and operating costs.

A study of the removal of benzene hydrocarbons and naphthalenes in absorption apparatuses, operating with high-boiling washing oils, reveals the disadvantages that it is impossible to adhere to the necessary final values for gas transmittance and distribution under pressure at usual normal-pressure absorption, and additionally, lowering of the water vapor dew point cannot be achieved.

Using indirect gas cooling in order to lower the dew point is disadvantageous in that a great cooling effort is required to cool the entire gas flow. Furthermore, a fine mist is formed together with the condensation which cannot be separated, even with high performance separators.

It is the object of the invention to increase the absorption ability of the solvent for aromatic hydrocarbons including naphthalene and water, to reduce the investment- and operating costs, to save energy and material, as well as to avoid operational disturbances and to increase safety.

SUMMARY OF THE INVENTION

It is the object of the invention to effectuate the simultaneous removal of aromatic hydrocarbons including naphthalenes and water from coal degasifying or cracking gases or other gases containing hydrocarbons, and to prevent the condensation of the aromatic hydrocarbons or the sublimation of the naphthalenes.

This object is accomplished by the invention in that a mixture of glycol, n-methyl-ε-caprolactam and water is used as a solvent.

In a preferred embodiment of the invention, the mixture comprises 79.9 to 97 percent by weight of glycol, 2 to 20 percent by weight of N-methyl-ε-caprolactam, and 0.1 to 1 percent by weight of water.

In another preferred embodiment of the invention, the regeneration of the charged solvent mixture occurs at temperatures between 150° to 190° C., preferably at 170° C., under normal pressure.

In another embodiment of the invention, 3 to 15 percent by weight, preferably 10 percent by weight, of crude benzene is added to the charged solvent mixture.

DETAILED DESCRIPTION OF PREFERRED EMBODIMENTS

The method of the invention results in the surprising effect of an almost complete absorption of the aromatic hydrocarbons, including naphthalenes, with simultaneous water vapor removal. It is additionally surprising that all absorbed components, including naphthalene as well, immediately exit from the distillation column during regeneration of the solvent mixture under normal pressure at temperatures under the boiling point of naphthalene of between 150° to 190° C., resulting in the regenerated solvent mixture being virtually free of these components and with regeneration being complete. Furthermore, the water content in the regenerated solvent mixture is approximately ten times lower than in pure glycol-water-mixtures under the same regeneration conditions. The water vapor dew points of the gas purified in this way correspond to the water vapor dew points produced by the ordinary drying apparatus when a significantly higher regeneration temperature is used. Thus the regeneration temperature of triethylene glycol is at least 210°–220° C. The method of the invention is characterized in that a complete, fine purification, for example an active coal arrangement, is not necessary. There is also considerable saving regarding electroenergy, water vapor and cooling water. Of considerable importance, is the increased absorption ability of the solvent mixture for aromatic hydrocarbons, naphthalene and water. The condensation or sublimation of the aromatic hydrocarbons, including naphthalene, is prevented during gas treatment, gas transmittance and gas distribution.

Examples of execution

The invention will be explained in detail below by means of two examples.

EXAMPLE 1

Cracking gas with the following parameters is to be dried, as well as cleansed of aromatic hydrocarbons including naphthalene:

| gas amount | 3,900 m$^3$/h |
| --- | --- |
| gas composition | |
| $H_2$ | 56 to 61 volume percent |
| CO | 7 to 13 volume percent |
| $CH_4$ | 3 to 8 volume percent |
| $C_mH_n$ | 1 to 2 volume percent |
| $CO_2$ | 12 to 13 volume percent |
| $N_2$ | 9 to 12 volume percent |
| benzene hydrocarbons | 3 g/m$^3$ i.N. |
| naphthalene | 5 g/m$^3$ i.N. |
| temperature | 25 to 30° C. water vapor saturated |
| gas pressure | 1.4 to 1.7 MPa |

The purified gas is to reach a water vapor dew point of $\leq -5°$ C. and a content of benzene hydrocarbons of 2.3 g/m$^3$ i.N., as well as a naphthalene content of 0.33 g/m$^3$ i.N.

A mixture, which comprises 84.2 percent by weight of triethylene glycol, 15.0 percent by weight of N-methyl-ε-caprolactam and 0.8 percent by weight of water is used as solvent. The method is carried out in a customary gas drying installation, comprising the principal equipment, the absorption apparatus and regeneration arrangement. The regeneration temperature of the charged solvent mixture is 177° C. The pure gas has a content of 1.66 to 2.1 g/m$^3$ i.N. of benzene hydrocarbon and <0.1 g/100 m$^3$ i.N. of naphthalene. The water vapor dew point is <−8° C.

EXAMPLE 2

In an absorption and regeneration apparatus, 65,000 m$^3$ i.N./h of mixed gas with the following parameters is to be dried and cleansed of aromatic hydrocarbons as well as of naphthalene:
intermediate gas composition

| $CO_2$ | 4.5 volume percent |
| --- | --- |
| $O_2$ | 0.5 volume percent |
| CO | 13.0 volume percent |
| $H_2$ | 55.8 volume percent |
| $CH_4$ | 14.6 volume percent |
| $N_2$ | 8.6 volume percent |
| $C_mH_n$ | 2.6 volume percent |

-continued

| sulphur compounds | 0.4 volume percent |
| --- | --- |

The aromatic hydrocarbons comprise 2.5 g/m$^3$ i.N. of benzene hydrocarbons and 0.8 g/m$^3$ i.N. of naphthalene.
gas temperature: 25° C. water vapor saturated
gas pressure: 2.5 MPa.
The pure gas is to have the following properties:

| water vapor dew point | $\leq -5$ | °C. |
| --- | --- | --- |
| benzene hydrocarbons | <1.4 | g/m$^3$ i.N. |
| naphthalene | $\leq 0.1$ | g/m$^3$ i.N. |

A mixture of 90 percent by weight of triethylene glycol, 9.5 percent by weight of N-methyl-ε-caprolactam and 0.5 percent by weight of water is used as solvent. The regeneration of the charged solvent mixture occurs at 170° C. During the regeneration of the charged solvent mixture, 10 percent by weight of crude benzene is added to the solvent mixture. At the head of the column there is a liquid mixture, resulting from condensation of the vapors, which is easily separated into an aqueous and an organic phase by the force of gravity, with the organic phase containing the naphthalene in a dissolved state, which is available as a commercial product.

The pure gas contains 1.0 g/m$^3$ i.N. of benzene hydrocarbons and less than 0.1 g/m$^3$ i.N. of naphthalene. The water vapor dew point is <−8° C.

If the water content in the solvent mixture is lowered from 0.5 to 0.1 weight percent, a water vapor dew point of below −15° C. can be reached without difficulty and without interfering with the removal of the naphthalene and the benzene hydrocarbons.

Diethylene glycol can be used instead of triethylene glycol as a mixing component in the solvent mixture.

We claim:

1. A solvent for the drying of gas and removal of aromatic hydrocarbons from said gas, said solvent comprising
 79.9 to 97 percent by weight of glycol,
 2 to 20 percent by weight of N-methyl-ε-caprolactam, and
 0.1 to 1 percent by weight of water.

2. The solvent of claim 1 in which the glycol is triethylene glycol.

3. The solvent of claim 1 in which the glycol is diethylene glycol.

4. The solvent of claim 1 which is regenerated at a temperature of 150° to 190° C.

5. The solvent of claim 4, in which 3 to 15 percent by weight of crude benzene is added just before regeneration.

6. The solvent of claim 5, in which about 10 percent by weight of crude benzene is added just before regeneration.

7. The solvent of claim 4 which purifies and dries gas to a water vapor dew point $\leq$ about −5° C., a benzene hydrocarbon content of $\leq$ about 2.3 g/m$^3$ i.N., and a naphthalene content of $\leq$ about 0.33 g/m$^3$ i.N.

8. The solvent of claim 4 which is regenerated at a temperature of about 170° C.

9. The solvent of claim 8 which purifies and dries gas to a water vapor dew point of $\leq$ about −5° C., a benzene hydrocarbon content of ≦ about 1.4 g/m³ i.N., and a naphthalene content of ≦ about 0.1 g/m³ i.N.

10. A process for drying gas and removing aromatic hydrocarbons from said gas which comprises
contacting said gas with a solvent which comprises 79.9 to 97 percent by weight of glycol, 2 to 20 percent by weight of N-methyl-ε-caprolactam and 0.1 to 1 percent by weight of water.

11. The process of claim 10 which comprises the additional step of regenerating the solvent at a temperature of 150° to 190° C., after contacting said solvent with said gas.

12. The process of claim 11 which additionally comprises adding 3 to 15 percent by weight of benzene to said solvent just before said solvent is regenerated.

13. The process of claim 11 in which said solvent is regenerated at a temperature of about 170° C.

14. The process of claim 13 in which about 10 percent by weight of crude benzene is added to said solvent.

15. The process of claim 13 in which said gas is purified and dried to a water vapor dew point of ≦ about −5° C., a benzene hydrocarbon content of ≦ about 1.4 g/m³ i.N., and a naphthalene content of ≦ about 0.1 g/m³ i.N.

16. The process of claim 11 in which said gas is purified and dried to a water vapor dew point of ≦ about −5° C., a benzene hydrocarbon content of ≦ about 2.3 g/m³ i.N., and a naphthalene content of ≦ about 0.33 g/m³ i.N.

17. The process of claim 10 in which the glycol is triethylene glycol.

18. The process of claim 10 in which the glycol is diethylene glycol.

* * * * *